United States Patent [19]

Matt

[11] Patent Number: 4,774,852
[45] Date of Patent: Oct. 4, 1988

[54] CAMPSHAFT FOR ACTUATING VALVE TAPPETS IN INTERNAL COMBUSTION ENGINES

[75] Inventor: Lukas Matt, Eschen, Liechtenstein

[73] Assignee: Etablissement Supervis, Vaduz, Liechtenstein

[21] Appl. No.: 8,309

[22] Filed: Jan. 29, 1987

[30] Foreign Application Priority Data

Feb. 26, 1986 [DE] Fed. Rep. of Germany ....... 3606111

[51] Int. Cl.$^4$ ............................................. F16H 53/00
[52] U.S. Cl. ..................................... 74/567; 403/372; 123/906
[58] Field of Search ................. 74/567; 384/585, 537; 123/90.6; 29/6, 525; 403/372, 365

[56] References Cited

U.S. PATENT DOCUMENTS

| 1,390,949 | 9/1921 | Yassenoff | 74/567 |
|---|---|---|---|
| 1,441,484 | 1/1923 | Conover | 403/272 X |
| 2,477,995 | 8/1949 | Marholz | 403/372 |
| 2,886,354 | 5/1959 | Bjorklund | 403/372 |
| 3,061,386 | 10/1962 | Dix et al. | 384/535 |
| 3,438,660 | 4/1969 | Steiner | 403/372 X |
| 3,543,589 | 12/1970 | Loughran, Jr. et al. | |
| 3,700,271 | 10/1972 | Blaurock et al. | 403/372 |
| 3,978,945 | 9/1976 | Gardner et al. | 403/372 X |
| 4,068,906 | 1/1978 | Dur et al. | 403/381 X |
| 4,569,614 | 2/1986 | Yamauchi | 403/372 X |

FOREIGN PATENT DOCUMENTS

| 253122 | 7/1964 | Australia | 403/372 |
|---|---|---|---|
| 234398 | 2/1987 | European Pat. Off. | |
| 2443318 | 4/1975 | Fed. Rep. of Germany | |
| 2657479 | 4/1979 | Fed. Rep. of Germany | |
| 2838995 | 7/1983 | Fed. Rep. of Germany | |
| 3321846 | 12/1983 | Fed. Rep. of Germany | |
| 3409541 | 11/1985 | Fed. Rep. of Germany | |
| 19932 | of 1897 | United Kingdom | 403/272 |
| 223300 | 10/1924 | United Kingdom | 403/272 |
| 547988 | 9/1942 | United Kingdom | 403/372 |
| 1073147 | 6/1967 | United Kingdom | 403/372 |
| 2121908 | 6/1982 | United Kingdom | 74/567 |

OTHER PUBLICATIONS

Antriebstechnick 15 (1976), Nr 9, Spannelemente, pp. 473, 474, R. Schumann.

Primary Examiner—Gary L. Smith
Assistant Examiner—Rodney M. Lindsey
Attorney, Agent, or Firm—Toren, McGeady & Associates

[57] ABSTRACT

A camshaft for actuating the valve tappets in internal combustion engines includes a shaft of a cold drawn pipe and a cam member. Both parts are connected to one another via an axially slotted tolerance ring. The bore of the cam member has an inwardly directed projection with essentially radially extending sides and a partially cylindrical surface having a curvature which corresponds to the curvature of the shaft. The edges forming the slot of the tolerance ring rest against the sides of the projection. The resulting circumferential bracing of the tolerance ring ensures a secure support of the cam member on the shaft. The projection is located in that angular range of the cam member in which the rotating cam during operation is in contact with the tappet to be actuated. Thus, the cam member is additionally braced by the cylindrical surface of the projection when the highest radial force acts on the cam member during a full rotation.

4 Claims, 2 Drawing Sheets

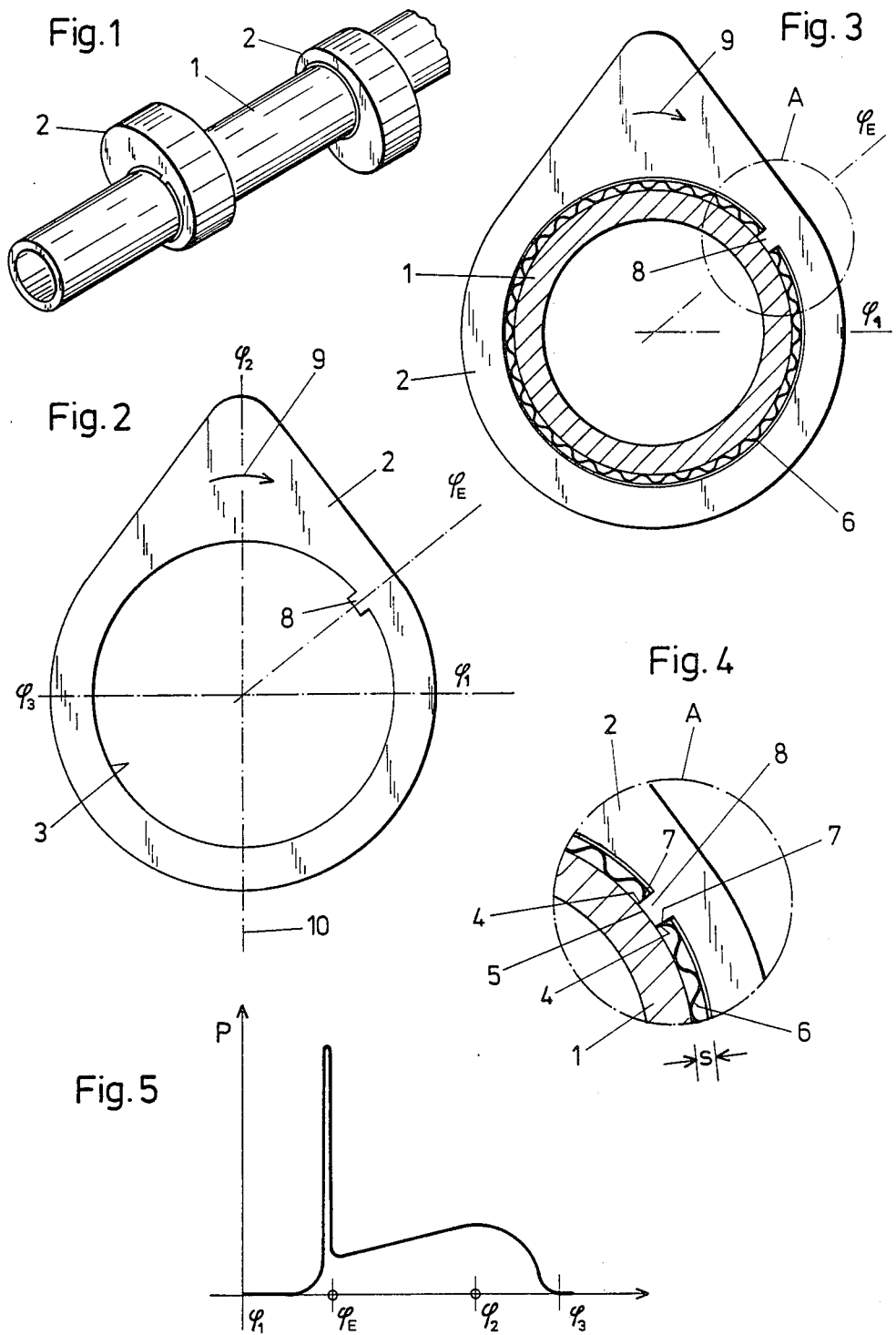

CAMPSHAFT FOR ACTUATING VALVE TAPPETS IN INTERNAL COMBUSTION ENGINES

BACKGROUND OF THE INVENTION

1. Field of the Invention

The present invention relates to a camshaft for actuating valve tappets in internal combustion engines. The camshaft includes a shaft member and at least one cam member slid onto and connected to the shaft member. For sliding the cam member onto the shaft member, the cam member defines an axial bore having a shape which essentially corresponds to the cross-sectional profile of the shaft member.

2. Description of the Prior Art

Camshafts of internal combustion engines are highly stressed structural machine parts. The large number of prior art publications in this area make it clear that substantial efforts have been made to find economical and technically satisfactory solutions for manufacturing useful camshafts.

It is to be particularly emphasized that during operation a camshaft is subjected to extreme dynamic stresses as a result of the type of task it has to perform. Thus, in all camshafts which have become known in the past, the connection between cam member and shaft member is an integrally formed metal connection and/or a positively locked connection. Substantial searches performed in the relevant field in the patent literature have not developed any other structural solutions than the already mentioned connection between cam member and shaft member which is an integrally formed metal connection and/or a positively locked connection.

In particular, camshafts are known in which the cams and the shaft are manufactured separately and are subsequently joined together to form a structural unit. In a known construction of this type, German Offenlegungsschrift No. 28 38 995 and German Offenlegungsschrift No. 33 21 846, the shaft is provided with a plurality of axially extending grooves and the bore in the cam has a corresponding radial projection which engages into one of these grooves. The bore of the cam surrounds the shaft with play and the aforementioned projection has such a size in radial direction that cam and shaft can be joined together and are locked together by means of a frictional engagement. The gap resulting from the aforementioned play is being filled with brazing solder from the outside after cam and shaft have been joined together. The number of grooves provided circumferentially on the shaft corresponds to the cam phase relationship required for the respective purpose of the camshaft. This construction is not advantageous because it is very difficult to manufacture the grooves on the shaft in exactly the correct position. These grooves must be manufactured very precisely, i.e., they must be exactly positioned with respect to their angular location.

U.S. Pat. No. 3,543,589 shows and describes a cam disk with balanced, spring-loaded feeler rollers. The cam disk has a plurality of essentially equal cam pumps which are uniformly distributed around an axis. In addition, two spaced-apart distance rollers are provided in such a manner relative to the cam disk that, when one feeler roller is on an ascending portion of a cam hump and, thus, removes energy from the drive mechanism, the other feeler roller rolls on a descending portion of a cam hump and, thus, returns energy into the system, wherein the energy returned is the same as that being removed from the system by the first feeler roller. The drawings of this patent illustrate this concept. The drawings also show the construction of the cam disk or control switch. A cam disk having an even number or an odd number of cam humps is arranged on a shaft of circular cross-section. The shaft is not indicated in detail. The feeler rollers are supported by resilient plates which, in turn, have electrical contacts, the feeler rollers are located relative to the cam disk in such a way that, when the cam disk is rotating, one of the feeler rollers rolls upwardly on a cam hump, while the other feeler roller simultaneously rolls down such a cam hump. The connection between the drive shaft and cam disk is formed by a hollow cylindrical element which is made of a macromolecular material. This prior U.S. patent does not show or describe a camshaft for internal combustion engines; rather, it describes a control shaft with a cam disk for actuating electrical plate contacts. The cam disk for controlling the feeler rollers or the switching springs can only handle small loads. The cam disk is to be uniformly stressed during a full rotation. The principal concept on which the prior aforedescribed construction is based is the energy recuperation and the resulting reduction of the torque of the drive motor.

It is also known in the art to use a so-called tolerance ring for a frictionally locking engagement between a shaft and a hub. This tolerance ring is an undulated spring steel strip which is bent into an open ring having a longitudinal slot. This ring is either slid onto the shaft or inserted into the hub bore. The size of the ring is such that, when the ring is inserted, the edges defining the longitudinal slot are spaced apart from each other. Once the parts to be joined have been put together, the tolerance ring, due to the aforementioned longitudinal slot, can slightly yield in radial direction as well as in circumferential direction in dependence upon the forces and moments acting on the machine elements connected by the ring. These so-called tolerance rings have been found very useful in general mechanical engineering because they facilitate a quick, inexpensive assembly and a simple construction of parts to be connected. The rings can compensate to a high degree different thermal expansions between machine elements of the different materials. The rings are resistant to temperature changes, they permit great tolerances between parts to be connected and, moreover, they are resistant to chemical attack.

A camshaft is a machine element of a special type, especially because during normal operation, it is subjected to very extreme dynamic loads. Thus, in the past, all cam shafts have a connection between shaft and cam which is an integrally formed material connection and/or a positively locked connection.

It is, therefore, the primary object of the present invention to simplify the manufacture of such a camshaft and, simultaneously, to improve its quality, while the shaft and the cams are still connected to each other only by frictional engagement and structural elements are used which are known for such a connection.

SUMMARY OF THE INVENTION

In accordance with the present invention, this complex object is met by providing between cam and shaft an undulated spring steel strip or tolerance ring which has a longitudinal slot, wherein the edges defining the longitudinal slot are braced in circumferential direction of the spring steel strip when the spring steel strip is placed in the bore of the cam or is slid onto the shaft in an unloaded state, i.e., prior to putting together the parts to be joined.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1 is a perspective view of a portion of a camshaft;

FIG. 2 is a side view of the cam of the camshaft of FIG. 1, on a larger scale;

FIG. 3 is a cross-sectional view of the camshaft of FIG. 1, also on a larger scale;

FIG. 4 shows a detail from FIG. 3 within circle A, on an even larger scale;

FIG. 5 is a diagram showing the pattern of the radial force acting on the cam during a rotation of the camshaft;

DETAILED DESCRIPTION OF THE INVENTION

Figure 6:
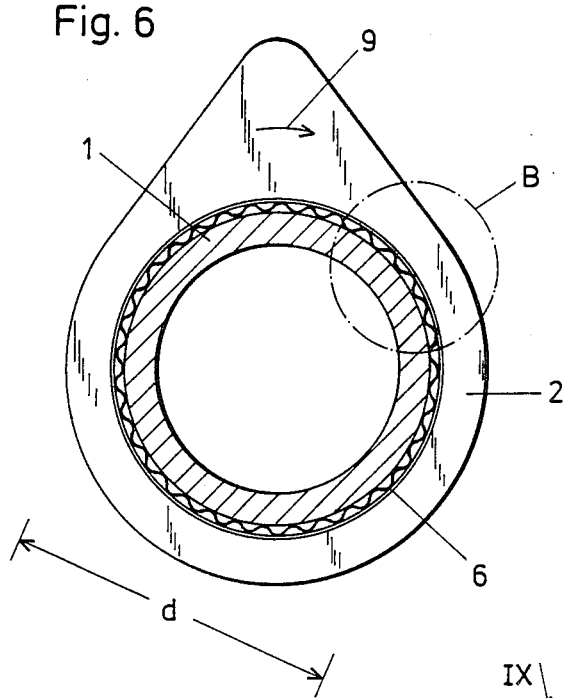
Figure 8:
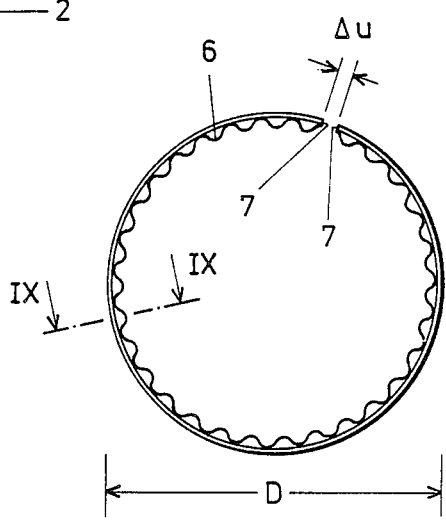
Figure 7:
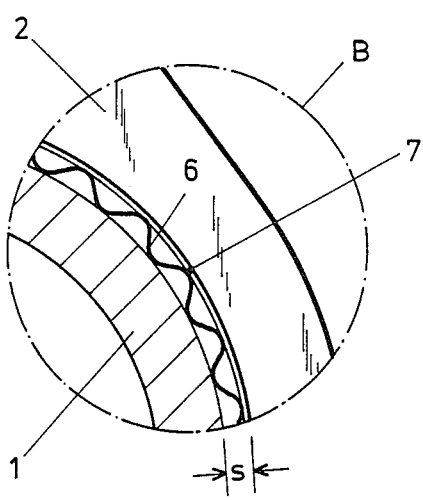
Figure 9:
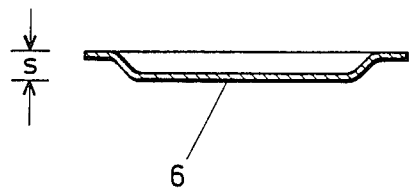

A camshaft illustrated in FIG. 1 includes a shaft 1 formed by a pipe and cams 2 mounted on the shaft 1. The cams 2 are spaced apart from each other in axial direction of the shaft 1. In addition, the cams are angularly offset relative to each other as it corresponds to the respective phase relationship of the motor elements to be actuated by the cam shaft.

FIG. 2 is an elevational view of a cam on a larger scale as compared to FIG. 1. The cam or its outer contour is symmetrical with respect to the axis 10. Cam 2 has a bore 3 whose diameter is slightly greater than the outer diameter of shaft 1. The surface formed by bore 3 has a projection 8 which protrudes toward the center of the cam. The projection 8 is defined by two essentially radially extending sides 4 and a surface 5 of the projection 8 facing the shaft 1 is formed as a partial cylindrical surface whose curvature essentially corresponds to the curvature of shaft 1. Thus, surface 5 rests completely without play on shaft 1 after the cam 2 has been mounted on the shaft. As a result, the offsetting between cam 2 and shaft 1 is extremely small during assembly.

As can be seen particularly from FIG. 3, a slotted, undulated spring steel strip 6 is placed between shaft 1 and the wall of bore 3. Strip 6 has a radial thickness s which corresponds to half the difference of the diameter of the bore 3 and the outer diameter of shaft 1. The radially measured height of projection 8 also corresponds approximately to this dimension s. Spring steel strips 6 of the above-mentioned type are known. They are called tolerance rings and are part of the group of connecting elements which are generally called tension springs.

The circumferential length of this tolerance ring is such that the edges 7 which define its longitudinal slot rests against the sides of projection 8 when the ring is properly inserted and unstressed, as illustrated in FIG. 4. Tolerance ring 6 is called unstressed in this connection when it is placed in bore 3 of cam 2 with the cam 2 not yet being slid onto shaft 1, while the edges 7 of the longitudinal slots are already resting against the sides 4 of projection 8.

Since the longitudinal edges of the longitudinal slot of tolerance ring 6 are resting against the sides 4 of projection 8, as can be seen in FIG. 4, once the shaft 1 and the cams 2 are connected, the connection is an extremely strong frictional engagement. When considering the pattern of the radial force P which acts on the cam 2 during the operation of the camshaft in dependence upon the angle of rotation of the camshaft 1, it can be seen that this radial force P has an extreme peak where cam 2 comes into frictional engagement with the valve tappet to be actuated by the cam, i.e., at the moment when the revolving cam 2 puts into motion and accelerates the tappet, not shown. The pattern of this radial force P is schematically illustrated in FIG. 5, wherein $\phi$ denotes the angle of rotation and P the radial force.

In accordance with the invention, projection 8 is provided in that angular area which corresponds to the angle $\phi_E$ shown in the diagram of FIG. 5. Thus, each cam 2 is braced relative to shaft 1 at the moment of its highest radial stress by means of the aforementioned surface 5 of projection 8. In the remaining area in which the radial force P acting on the cam is smaller, cam 2 is braced relative to shaft 1 through tolerance ring 6 which provides an extremely safe and secure support of cam 2 on shaft 1 due to the circumferential clamping resulting from the bracing of the edges 7 of the longitudinal slot against the sides 4 of projection 8.

In this connection, reference is once again made to German Offenlegungsschrift No. 33 21 846 in which a triangle-shaped cam in a hub is offset by an angle $\beta$ relative to the plane of symmetry of this cam. This angle $\beta$ is equal to half the angle $\alpha$ which, in turn, corresponds to the angle between inlet and outlet valve. In the construction according to the present invention, on the other hand, the claimed angle position is a function of the cam. In the construction disclosed in German Offenlegungsschrift No. 33 21 846, forces can be transmitted in circumferential direction only by the spring and groove connection provided in that case. The springs are angularly offset, so that only every other cam along the camshaft has its spring projection at the correct place, wherein the spring projections shown in German Offenleungsschrift No. 33 21 846 have the sole purpose of positioning. In accordance with the present invention, on the other hand, the cam can assume any angular position relative to the shaft.

As a rule, a plurality of angularly offset cams 2 are placed on shaft 1. The camshaft is assembled by placing the tolerance rings into the bores 3 of the cams and sliding the cams prepared in this manner onto the shaft 1 in the appropriate angular position relative to the shaft. Extensive tests have shown that the tolerance ring 6 braced in this manner provides a safe and secure connection, even when the camshaft is sub-jected to very high stress. The tool used for assembling the camshaft is constructed in such a way that it ensures that the tolerance ring 6 maintains its correct position within bore 3 during the sliding of the cam 2 onto the shaft 1.

When the camshaft is assembled, the cams are placed in a tool with the appropriate axial spacing and offset as intended. The support members for the cam in this tool may be connected to load measuring devices, so that, when the shaft 1 is inserted, it can be determined whether the connecting force required for a proper and safe seat of the shaft has been reached.

The cam 2 may be made of a solid material in a chip-removing method. However, it advantageous to sinter the cam, i.e., to use a manufacturing process which is particularly advantageous if the cylinder wall of bore 3 for receiving the shaft 1 is interrupted by projection 8.

In the embodiment illustrated in FIGS. 2, 3 and 4, the projection 8 against whose sides 4 the edges 7 of the longitudinal slot of the tolerance ring 6 are braced is formed integrally with the cam 2. In order to brace the tolerance ring 6 in the described manner, it would also be possible to form a ledge on shaft 1 protruding above the circumference of the shaft. This ledge would assume the function of projection 8.

In accordance with another possibility, a ledge of the described type could be manufactured as a separate structural component and could be inserted between shaft 1 and cam 2 together with tolerance ring 6. Such a ledge could have a height which is greater than half the difference of the inner diameter of the bore 3 and the outer diameter of shaft 1. In this case, a groove would have to be provided in the shaft and/or in the cam which groove receives a portion of the height of such a ledge during the assembly. However, all these measures are very cumbersome and complicated with respect to manufacturing technology and assembly and, thus, will be of less significance in the mass production of cam shafts.

Due to the simple construction according to the invention, the shaft 1 may be a cold drawn pipe which does not have to be finished. Compared to all known camshaft constructions, the proposal according to the present invention is distinguished by a particularly simple structure which can be reached simply and inexpensively.

While specific embodiments of the invention have been shown and described in detail to illustrate the application of the inventive principles, it will be understood that the invention may be embodied otherwise without departing from such principles.

I claim:

1. A camshaft for actuating valve tappets in internal combustion engines, comprising a shaft, at least one cam member defining a bore having a size essentially corresponding to the cross-sectional shape of the shaft, the cam member being slid onto and connected to the shaft, an undulating annular spring steel strip placed between the shaft and the inwardly facing surface of the bore of the cam member, the annular strip defining an axially extending slot, the slot being formed by axially extending edges of the annular strip facing each other, means for bracing the edges of the strip in circumferential direction of the strip when the strip is in the unloaded state onto the shaft or placed in the bore of the cam member prior to assembly of the shaft with the cam member, the means for bracing the edges of the strip comprising an inwardly facing projection formed on the inner surface of the bore of the cam member, the projection having essentially radially extending sides and a cylindrically shaped inwardly facing surface, the curvature of the surface of the projection essentially corresponding to curvature of the shaft surface, wherein the surface of the projection rests against the shaft surface and the edges of the strip forming the slot rest against the sides of the projection, wherein the cam member defines an axis of symmetry, the projection being located relative to the axis of symmetry within the angular range in which the rotating cam during operation is in contact with the tappet to be actuated.

2. The camshaft according to claim 1, wherein the radial thickness of the spring steel strip in the loaded state between cam member and shaft corresponds essentially to the radial height of the projection.

3. The camshaft according to claim 1, wherein the radial thickness of the unloaded spring steel strip is slightly greater than half the difference of the diameter of the bore and the outer diameter of the shaft.

4. The camshaft according to claim 1, wherein the shaft is a cold drawn pipe.

* * * * *

UNITED STATES PATENT AND TRADEMARK OFFICE
CERTIFICATE OF CORRECTION

PATENT NO.   :  4,774,852
DATED        :  October 4, 1988
INVENTOR(S)  :  Lukas Matt It is certified that error appears in the above-identified patent and that said Letters Patent is hereby corrected as shown below:

[54] Title corrected to read:

CAMSHAFT FOR ACTUATING VALVE
TAPPETS IN INTERNAL COMBUSTION
ENGINES

Signed and Sealed this

Eighteenth Day of April, 1989

Attest:

DONALD J. QUIGG

*Attesting Officer*  *Commissioner of Patents and Trademarks*